(12) United States Patent
Lin et al.

(10) Patent No.: US 9,877,273 B2
(45) Date of Patent: Jan. 23, 2018

(54) DEVICE-TO-DEVICE COMMUNICATION METHOD, TERMINAL, AND NETWORK DEVICE

(71) Applicant: Huawei Technologies Co., Ltd., Shenzhen (CN)

(72) Inventors: Bo Lin, Beijing (CN); Chao Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/821,374

(22) Filed: Aug. 7, 2015

(65) Prior Publication Data

US 2015/0351020 A1 Dec. 3, 2015

Related U.S. Application Data

(63) Continuation of application No. PCT/CN2013/071554, filed on Feb. 8, 2013.

(51) Int. Cl.
*H04M 11/04* (2006.01)
*H04W 48/16* (2009.01)
(Continued)

(52) U.S. Cl.
CPC .......... *H04W 48/16* (2013.01); *H04B 17/318* (2015.01); *H04W 4/005* (2013.01);
(Continued)

(58) Field of Classification Search
CPC ... H04W 48/16; H04W 8/005; H04W 76/023; H04W 4/22; H04W 4/005; H04W 76/02; H04B 17/318
(Continued)

(56) References Cited

U.S. PATENT DOCUMENTS 8,499,097 B1 * 7/2013 Muhanna .............. H04W 8/082
709/224
2012/0163235 A1 6/2012 Ho et al.
(Continued)

FOREIGN PATENT DOCUMENTS

CN 101772199 A 7/2010
CN 102547984 A 7/2012
(Continued)

OTHER PUBLICATIONS

3rd Generation Partnership Project; Technical Specification Group Radio Access Network; Evolved Universal Terrestrial Radio Access (E-UTRA); User Equipment (UE) procedures in idle mode (Release 11), 3GPP TS 36.304 V11.2.0, Dec. 2012, 33 pages.

*Primary Examiner* — Shahriar Behnamian
(74) *Attorney, Agent, or Firm* — Slater Matsil, LLP

(57) ABSTRACT

The present invention provides a D2D communication method, a terminal, and a network device. The method includes: acquiring, by a first terminal, network information, where the network information includes a system message sent by a network device and/or a cell coverage result; determining, by the first terminal according to the network information, whether to enable D2D communication for autonomously discovering a second terminal; and if the first terminal determines to enable the D2D communication, discovering, by the first terminal, the second terminal autonomously, and performing the D2D communication with the second terminal directly.

17 Claims, 5 Drawing Sheets

(51) Int. Cl.
*H04W 4/00* (2009.01)
*H04W 4/22* (2009.01)
*H04B 17/318* (2015.01)
*H04W 76/02* (2009.01)
*H04W 8/00* (2009.01)

(52) U.S. Cl.
CPC ............ *H04W 4/22* (2013.01); *H04W 8/005* (2013.01); *H04W 76/02* (2013.01); *H04W 76/023* (2013.01)

(58) Field of Classification Search
USPC ........................................... 455/404.1, 404.2
See application file for complete search history.

(56) References Cited

U.S. PATENT DOCUMENTS

| | | | |
|---|---|---|---|
| 2012/0243431 A1 | 9/2012 | Chen et al. | |
| 2012/0243437 A1 | 9/2012 | Horn et al. | |
| 2013/0148161 A1* | 6/2013 | Park | G06F 3/1296 358/1.15 |
| 2013/0148162 A1* | 6/2013 | Park | G06F 3/1296 358/1.15 |
| 2013/0155954 A1* | 6/2013 | Wang | H04W 4/005 370/328 |
| 2014/0106707 A1* | 4/2014 | Bontu | H04W 76/023 455/410 |
| 2015/0018037 A1* | 1/2015 | Kawakami | H04W 4/008 455/553.1 |

FOREIGN PATENT DOCUMENTS

| | | |
|---|---|---|
| CN | 102665213 A | 9/2012 |
| CN | 102792745 A | 11/2012 |
| CN | 102857901 A | 1/2013 |
| EP | 2878144 A1 | 6/2015 |
| WO | 2014017070 A1 | 1/2014 |

* cited by examiner

DEVICE-TO-DEVICE COMMUNICATION METHOD, TERMINAL, AND NETWORK DEVICE

This application is a continuation of International Application No. PCT/CN2013/071554, filed on Feb. 8, 2013, which is hereby incorporated by reference in its entirety.

TECHNICAL FIELD

The present invention relates to communications technologies, and in particular, to a device-to-device (D2D) communication method, a terminal, and a network device.

BACKGROUND

D2D communication is a technology that allows communication to be performed directly between terminals by applying available resources, which can reduce transmit power of a terminal, reduce load of a base station, and solve a problem of spectrum resource shortage of a wireless communications system to some extent. Currently, for D2D communication, there is a D2D communication mode independent of a network. In this communication mode, a terminal may work on a license-exempt band. The terminal autonomously finds available resources around by scanning, and performs neighboring terminal discovery and a data transmission process.

The D2D communication independent of a network may be applied in a public security scenario. For example, the public security scenario may be that a cellular network cannot work normally in an earthquake or emergency situation. Because no network participates in the D2D communication independent of a network, a terminal can discover a neighboring terminal in time, so that a terminal outside the earthquake or emergency situation can communicate with a terminal in the earthquake or emergency situation, which is helpful in implementing timely rescue. However, this communication mode cannot meet a requirement that a network can be controlled.

SUMMARY

In view of this, embodiments of the present invention provide a D2D communication method, a terminal, and a network device, so as to meet a requirement that a network can be controlled.

According to a first aspect, a D2D communication method is provided, including: acquiring, by a first terminal, network information, where the network information includes a system message sent by a network device and/or a cell coverage result; determining, by the first terminal according to the network information, whether to enable D2D communication for autonomously discovering a second terminal; and if the first terminal determines to enable the D2D communication, discovering, by the first terminal, the second terminal autonomously, and performing the D2D communication with the second terminal directly.

With reference to the first aspect, in a first possible implementation manner of the first aspect, if the network information includes the system message, the determining, according to the network information, whether to enable D2D communication includes: if the system message includes indication information of forbidding the D2D communication or none of the following items is included in the system message: indication information of allowing the D2D communication, warning information, and resource information of the D2D communication, determining, by the first terminal, to forbid enabling the D2D communication; or if the system message includes at least one of the following items: indication information of allowing the D2D communication, resource information of the D2D communication, and warning information, determining, by the first terminal, to enable the D2D communication.

With reference to the first possible implementation manner of the first aspect, in a second possible implementation manner of the first aspect, the cell coverage result includes a result of discovering a cell by the first terminal; and if the network information further includes the cell coverage result, the determining, according to the network information, whether to enable D2D communication includes: if the result of discovering a cell by the first terminal indicates that the first terminal can discover the cell, determining, by the first terminal according to the system message, whether to enable the D2D communication; and/or the cell coverage result includes a result of measuring a signal of a cell by the first terminal, and the measurement result includes signal strength and/or signal quality; and if the network information further includes the cell coverage result, the determining, according to the network information, whether to enable D2D communication includes: if the result of measuring a signal of the cell by the first terminal indicates that a measurement result of a cell with a best measurement result is higher than a set threshold, or the result of measuring a signal of the cell indicates that a measurement result of at least one cell is higher than a set threshold, determining, by the first terminal according to the system message, whether to enable the D2D communication.

With reference to the first or second possible implementation manner of the first aspect, in a third possible implementation manner of the first aspect, the warning information includes: earthquake and tsunami warning system ETWS information and/or commercial mobile alert system CMAS information.

With reference to the first aspect, in a fourth possible implementation manner of the first aspect, the cell coverage result includes a result of discovering a cell by the first terminal; and if the network information includes the cell coverage result, the determining, according to the network information, whether to enable D2D communication includes: if the result of discovering a cell by the first terminal indicates that the first terminal cannot discover the cell on all frequencies supported by the first terminal, determining, by the first terminal, to enable the D2D communication; and/or the cell coverage result includes a result of measuring a signal of a cell by the first terminal, and the measurement result includes signal strength and/or signal quality; and if the network information includes the cell coverage result, the determining, according to the network information, whether to enable D2D communication includes: if the result of measuring a signal of the cell by the first terminal indicates that a measurement result of a cell with a best measurement result is lower than a set threshold, or the result of measuring a signal of the cell indicates that measurement results of all cells are lower than a set threshold, determining, by the first terminal, to enable the D2D communication.

With reference to the first aspect or any possible implementation manner of the first aspect, in a fifth possible implementation manner of the first aspect, before the determining, by the first terminal according to the network information, whether to enable D2D communication, the method further includes: detecting, by the first terminal, a subscriber identity module of the first terminal, and determining that the subscriber identity module can be detected.

With reference to the first aspect or any possible implementation manner of the first aspect, in a sixth possible implementation manner of the first aspect, the acquiring, by a first terminal, network information includes: after a radio resource control RRC layer of the first terminal receives a D2D enable request sent by a non-access stratum NAS layer or an application layer of the first terminal, acquiring, by the RRC layer, the network information.

With reference to the fifth possible implementation manner of the first aspect, in a seventh possible implementation manner of the first aspect, the determining, by the first terminal according to the network information, whether to enable D2D communication includes: determining, by the RRC layer according to the network information, to forbid enabling the D2D communication; and after the determining, by the RRC layer, to forbid enabling the D2D communication, the method further includes: if the D2D enable request is sent by the NAS layer, sending, by the RRC layer, a D2D enable request non-acknowledgement message to the NAS layer, and forbidding, by the NAS layer, the first terminal to enable the D2D communication; or if the D2D enable request is sent by the application layer, sending, by the RRC layer, a D2D enable request non-acknowledgement message to the application layer, and forbidding, by the application layer, the first terminal to enable the D2D communication; or forbidding, by the RRC layer, the first terminal to enable the D2D communication.

With reference to the sixth or seventh possible implementation manner of the first aspect, in an eighth possible implementation manner of the first aspect, the determining, by the first terminal according to the network information, whether to enable D2D communication includes: determining, by the RRC layer according to the network information, to enable the D2D communication; and enabling, by the first terminal, the D2D communication includes: if the D2D enable request is sent by the NAS layer, sending, by the RRC layer, a D2D enable request acknowledgement message to the NAS layer, and triggering, by the NAS layer, the first terminal to enable the D2D communication; or if the D2D enable request is sent by the application layer, sending, by the RRC layer, a D2D enable request acknowledgement message to the application layer, and triggering, by the application layer, the first terminal to enable the D2D communication; or, triggering, by the RRC layer, the first terminal to enable the D2D communication.

According to a second aspect, a D2D communication method is provided, including: generating, by a network device, a first signal, where the first signal includes a system message or a detection signal; and sending, by the network device, the first signal to a first terminal, where the first signal is used to cause that: the first terminal determines, according to the first signal, whether to enable D2D communication for autonomously discovering a second terminal, and after determining to enable the D2D communication, discovers the second terminal autonomously, and performs the D2D communication with the second terminal directly.

With reference to the second aspect, in a first possible implementation manner of the second aspect, if the first signal includes the system message, the system message carries indication information of forbidding the D2D communication or none of the following items is included in the system message: indication information of allowing the D2D communication, warning information, and resource information of the D2D communication, where the system message is used to cause the first terminal to determine, according to the system message, to forbid enabling the D2D communication; or the system message includes at least one of the following items: indication information of allowing the D2D communication, resource information of the D2D communication, and warning information, where the system message is used to cause the first terminal to determine, according to the system message, to enable the D2D communication.

With reference to the first possible implementation manner of the second aspect, in a second possible implementation manner of the second aspect, the warning information includes: earthquake and tsunami warning system ETWS information and/or commercial mobile alert system CMAS information.

With reference to the second aspect, in a third possible implementation manner of the second aspect, the first signal is the detection signal, which is used to cause the first terminal to use the detection signal to perform cell discovery or measure the detection signal, and determine, according to a cell discovery result, whether to enable the D2D communication, or determine, according to a measurement result of the detection signal, whether to enable the D2D communication.

According to a third aspect, a terminal is provided, where the terminal is a first terminal, and the terminal includes: an acquiring module, configured to acquire network information, where the network information includes a system message sent by a network device and/or a cell coverage result; a determining module, configured to determine, according to the network information acquired by the acquiring module, whether to enable device-to-device D2D communication for autonomously discovering a second terminal; and a communication module, configured to: after the determining module determines to enable the D2D communication, discover the second terminal autonomously, and perform the D2D communication with the second terminal directly.

With reference to the third aspect, in a first possible implementation manner of the third aspect, if the network information includes the system message, the determining module is specifically configured to determine, in the following manner, whether to enable device-to-device D2D communication: if the system message includes indication information of forbidding the D2D communication or none of the following items is included in the system message: indication information of allowing the D2D communication, warning information, and resource information of the D2D communication, determining to forbid enabling the D2D communication; or if the system message includes at least one of the following items: indication information of allowing the D2D communication, resource information of the D2D communication, and warning information, determining to enable the D2D communication.

With reference to the first possible implementation manner of the third aspect, in a second possible implementation manner of the third aspect, the cell coverage result includes a result of discovering a cell by the first terminal; and if the network information further includes the cell coverage result, the determining module is specifically configured to determine, in the following manner and according to the network information, whether to enable D2D communication: if the result of discovering a cell by the first terminal indicates that the first terminal can discover the cell, determining, according to the system message, whether to enable the D2D communication; and/or the cell coverage result includes a result of measuring a signal of a cell by the first terminal, and the measurement result includes signal strength and/or signal quality; and if the network information further includes the cell coverage result, the determining module is specifically configured to determine, in the following manner and according to the network information, whether to enable D2D communication: if the measurement result indicates that a measurement result of a cell with a best measurement result is higher than a set threshold, or the measurement result indicates that a measurement result of at least one cell is higher than a set threshold, determining, according to the system message, whether to enable the D2D communication.

With reference to the first or second possible implementation manner of the third aspect, in a third possible implementation manner of the third aspect, the warning information included in the system message acquired by the acquiring module includes: earthquake and tsunami warning system ETWS information and/or commercial mobile alert system CMAS information.

With reference to the third aspect, in a fourth possible implementation manner of the third aspect, if the network information includes the cell coverage result, the determining module is specifically configured to determine, in the following manner, whether to enable device-to-device D2D communication: if the cell coverage result includes a result of discovering a cell by the first terminal, and if the result of discovering a cell by the first terminal indicates that the first terminal cannot discover the cell on all frequencies supported by the first terminal, determining to enable the D2D communication; and/or if the cell coverage result includes a result of measuring a signal of a cell by the first terminal, and the measurement result includes signal strength and/or signal quality, and if the result of measuring a signal of the cell by the first terminal indicates that a measurement result of a cell with a best measurement result is lower than a set threshold, or the result of measuring a signal of the cell indicates that measurement results of all cells are lower than a set threshold, determining to enable the D2D communication.

With reference to the third aspect or any possible implementation manner of the third aspect, in a fifth possible implementation manner of the third aspect, the determining module is further configured to: before determining whether to enable the D2D communication, detect a subscriber identity module of the first terminal, and determine that the subscriber identity module can be detected.

With reference to the third aspect or any of the first to fourth possible implementation manners of the third aspect, in a sixth possible implementation manner of the third aspect, the terminal further includes: a radio resource control RRC entity module, where the RRC entity module includes the acquiring module; and a non-access stratum NAS entity module, configured to generate a D2D enable request, where the acquiring module is specifically configured to acquire the network information in the following manner: acquiring the network information after receiving the D2D enable request generated by the NAS entity module; or an application layer entity module, configured to generate a D2D enable request, where the acquiring module is specifically configured to acquire the network information in the following manner: acquiring the network information after receiving the D2D enable request generated by the application layer entity module.

With reference to the sixth possible implementation manner of the third aspect, in a seventh possible implementation manner of the third aspect, the RRC entity module further includes the determining module, where the determining module is further configured to: if the determining module determines to forbid enabling the D2D communication and if the D2D enable request is sent by the NAS entity unit, the determining module sends a D2D enable request non-acknowledgement message to the NAS entity module; and the NAS entity module is further configured to: after receiving the D2D enable request non-acknowledgement message, forbid the communication module to enable the D2D communication; or the determining module is further configured to: if the determining module determines to forbid enabling the D2D communication and if the D2D enable request is sent by the application layer entity module, the determining module sends a D2D enable request non-acknowledgement message to the application layer entity module; and the application layer entity module is configured to: after receiving the D2D enable request non-acknowledgement message, forbid the communication module to enable the D2D communication.

With reference to the sixth or seventh possible implementation manner of the third aspect, in an eighth possible implementation manner of the third aspect, the RRC entity module further includes the determining module, where the determining module is further configured to: if the determining module determines to enable the D2D communication and if the D2D enable request is sent by the NAS entity module, the determining module sends a D2D enable request acknowledgement message to the communication module, so that the communication module triggers enabling of the D2D communication; or the determining module is further configured to: if the determining module determines to enable the D2D communication and if the D2D enable request is sent by the application layer entity module, the determining module sends a D2D enable request acknowledgement message to the communication module, so that the communication module triggers enabling of the D2D communication.

According to a fourth aspect, a network device is provided, including: a generating module, configured to generate a first signal, where the first signal includes a system message or a detection signal; and a sending module, configured to send the first signal generated by the generating module to a first terminal, where the first signal is used to cause that: the first terminal determines, according to the first signal, whether to enable device-to-device D2D communication, and after determining to enable the D2D communication, enables the D2D communication, discovers a second terminal autonomously, and performs the D2D communication with the second terminal directly.

With reference to the fourth aspect, in a first possible implementation manner of the fourth aspect, if the first signal generated by the generating module includes the system message, the system message carries indication information of forbidding the D2D communication or none of the following items is included in the system message: indication information of allowing the D2D communication, warning information, and resource information of the D2D communication, where the system message is used to cause the first terminal to determine, according to the system message, to forbid enabling the D2D communication; or the system message includes at least one of the following items: indication information of allowing the D2D communication, resource information of the D2D communication, and warning information, where the system message is used to cause the first terminal to determine, according to the system message, to enable the D2D communication.

With reference to the first possible implementation manner of the fourth aspect, in a second possible implementation manner of the fourth aspect, the warning information included in the system message generated by the generating module includes: earthquake and tsunami warning system ETWS information and/or commercial mobile alert system CMAS information.

With reference to the fourth aspect, in a third possible implementation manner of the fourth aspect, the first signal generated by the generating module includes the detection signal, which is used to cause the first terminal to use the detection signal to perform cell discovery or measure the detection signal, and determine, according to a cell discovery result, whether to enable the D2D communication, or determine, according to a measurement result of the detection signal, whether to enable the D2D communication.

According to a fifth aspect, a terminal is provided, where the terminal is a first terminal, and the terminal includes: a processor, configured to acquire network information, where the network information includes a system message sent by a network device and/or a cell coverage result; configured to determine, according to the network information, whether to enable D2D communication for autonomously discovering a second terminal; and configured to: after determining to enable the D2D communication, enable the D2D communication, discover the second terminal autonomously, and control a transceiver to perform the D2D communication with the second terminal directly; and the transceiver, configured to perform the D2D communication with the second terminal directly under control of the processor.

With reference to the fifth aspect, in a first possible implementation manner of the fifth aspect, if the network information includes the system message, the processor is specifically configured to determine, in the following manner, whether to enable D2D communication: if the system message includes indication information of forbidding the D2D communication or none of the following items is included in the system message: indication information of allowing the D2D communication, warning information, and resource information of the D2D communication, determining to forbid enabling the D2D communication; or if the system message includes at least one of the following items: indication information of allowing the D2D communication, resource information of the D2D communication, and warning information, determining to enable the D2D communication.

With reference to the first possible implementation manner of the fifth aspect, in a second possible implementation manner of the fifth aspect, the cell coverage result includes a result of discovering a cell by the first terminal; and if the network information further includes the cell coverage result, the processor is specifically configured to determine, in the following manner and according to the network information, whether to enable D2D communication: if the discovery result indicates that the first terminal can discover the cell, determining, according to the system message, whether to enable the D2D communication; and/or the cell coverage result includes a result of measuring a signal of a cell by the first terminal, and the measurement result includes signal strength and/or signal quality; and if the network information further includes the cell coverage result, the processor is specifically configured to determine, in the following manner and according to the network information, whether to enable D2D communication: if the result of measuring a signal of the cell by the first terminal indicates that a measurement result of a cell with a best measurement result is higher than a set threshold, or the result of measuring a signal of the cell indicates that a measurement result of at least one cell is higher than a set threshold, determining, according to the system message, whether to enable the D2D communication.

With reference to the first or second possible implementation manner of the fifth aspect, in a third possible implementation manner of the fifth aspect, the warning information acquired by the processor includes: earthquake and tsunami warning system ETWS information and/or commercial mobile alert system CMAS information.

With reference to the fifth aspect, in a fourth possible implementation manner of the fifth aspect, if the network information includes the cell coverage result, the processor is specifically configured to determine, in the following manner, whether to enable D2D communication: if the cell coverage result includes a result of discovering a cell by the first terminal and the result of discovering a cell by the first terminal indicates that the first terminal cannot discover the cell on all frequencies supported by the first terminal, determining to enable the D2D communication; and/or if the cell coverage result includes a result of measuring a signal of a cell by the first terminal, and the measurement result includes signal strength and/or signal quality, and if the result of measuring a signal of the cell by the first terminal indicates that a measurement result of a cell with a best measurement result is lower than a set threshold, or the result of measuring a signal of the cell indicates that measurement results of all cells are lower than a set threshold, determining to enable the D2D communication.

With reference to the fifth aspect or any possible implementation manner of the fifth aspect, in a fifth possible implementation manner of the fifth aspect, the processor is further configured to: before determining whether to enable the D2D communication, detect a subscriber identity module of the first terminal, and determine that the subscriber identity module can be detected.

With reference to the fifth aspect or any of the first to fourth possible implementation manners of the fifth aspect, in a sixth possible implementation manner of the fifth aspect, the processor includes a non-access stratum NAS layer entity, a radio resource control RRC layer entity, and an application layer entity, where the NAS layer entity is configured to generate a D2D enable request; and the RRC layer entity is configured to acquire the network information after receiving the D2D enable request sent by the NAS layer entity; or the application layer entity is configured to generate a D2D enable request; and the RRC layer entity is configured to acquire the network information after receiving the D2D enable request sent by the application layer entity.

With reference to the sixth possible implementation manner of the fifth aspect, in a seventh possible implementation manner of the fifth aspect, the RRC layer entity is further configured to: if it is determined to forbid enabling the D2D communication and if the D2D enable request is sent by the NAS layer entity, send a D2D enable request non-acknowledgement message to the NAS layer entity; and the NAS layer entity is further configured to forbid enabling the D2D communication; or the RRC layer entity is further configured to: if it is determined to forbid enabling the D2D communication and if the D2D enable request is sent by the application layer entity, send a D2D enable request non-acknowledgement message to the application layer entity, so that the application layer entity forbids enabling the D2D communication; or the RRC layer entity is further configured to: after it is determined to forbid enabling the D2D communication, forbid enabling the D2D communication.

With reference to the sixth or seventh possible implementation manner of the fifth aspect, in an eighth possible implementation manner of the fifth aspect, the RRC layer entity is further configured to: if it is determined to enable the D2D communication and if the D2D enable request is sent by the NAS layer entity, send a D2D enable request acknowledgement message to the NAS layer entity; and the NAS layer entity is further configured to trigger enabling of the D2D communication; or the RRC layer entity is further configured to: if it is determined to enable the D2D communication and if the D2D enable request is sent by the application layer entity, send a D2D enable request acknowledgement message to the application layer entity; and the application layer entity is further configured to trigger enabling of the D2D communication; or the RRC layer entity is further configured to trigger enabling of the D2D communication if it is determined to enable the D2D communication.

According to a sixth aspect, a network device is provided, including: a processor, configured to generate a first signal, where the first signal includes a system message or a detection signal; and a sender, configured to send the first signal generated by the processor to a first terminal, where the first signal is used to cause that: the first terminal determines, according to the first signal, whether to enable device-to-device D2D communication, and after determining to enable the D2D communication, enables the D2D communication for autonomously discovering a second terminal, and discovers the second terminal autonomously, so that the first terminal performs the D2D communication with the second terminal directly.

With reference to the sixth aspect, in a first possible implementation manner of the sixth aspect, if the first signal includes the system message, the system message sent by the sender carries indication information of forbidding the D2D communication or none of the following items is included in the system message: indication information of allowing the D2D communication, warning information, and resource information of the D2D communication, where the system message is used to cause the first terminal to determine, according to the system message, to forbid enabling the D2D communication; or the system message sent by the sender includes at least one of the following items: indication information of allowing the D2D communication, resource information of the D2D communication, and warning information, where the system message is used to cause the first terminal to determine, according to the system message, to enable the D2D communication.

With reference to the first possible implementation manner of the sixth aspect, in a second possible implementation manner of the sixth aspect, the warning information included in the system message sent by the sender includes: earthquake and tsunami warning system ETWS information and/or commercial mobile alert system CMAS information.

With reference to the sixth aspect, in a third possible implementation manner of the sixth aspect, the first signal sent by the sender includes the detection signal, which is used to cause the first terminal to use the detection signal to perform cell discovery or measure the detection signal, and determine, according to a cell discovery result, whether to enable the D2D communication, or determine, according to a measurement result of the detection signal, whether to enable the D2D communication.

According to the foregoing technical solutions, a terminal determines, according to network information, whether to enable D2D communication, so as to implement that a network can be controlled; by means of communication performed between terminals directly during D2D communication, problems caused by the fact that a base station is unavailable in a case of a disaster can be solved, and requirements of a public security scenario are met. Therefore, a requirement that a network can be controlled is met, and an application in a public security scenario is implemented.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications ("GSM" for short) system, a Code Division Multiple Access ("CDMA" for short) system, a Wideband Code Division Multiple Access ("WCDMA" for short) system, a General Packet Radio Service ("GPRS" for short) system, a Long Term Evolution ("LTE" for short) system, an LTE frequency division duplex ("FDD" for short) system, an LTE time division duplex ("TDD" for short), a Universal Mobile Telecommunications System ("UMTS" for short), or a Worldwide Interoperability for Microwave Access ("WiMAX" for short) communications system.

It should also be understood that in the embodiments of the present invention, user equipment ("UE" for short) may be referred to as a terminal, a mobile station ("MS" for short), a mobile terminal, or the like. The user equipment may communicate with one or more core networks through a radio access network ("RAN" for short). For example, the user equipment may be a mobile phone (also referred to as a "cellular" phone), a computer with a mobile terminal, or the like. For example, the user equipment may also be a portable, pocket-sized, handheld, computer built-in, or in-vehicle mobile apparatus, which exchanges voice and/or data with the radio access network.

In the embodiments of the present invention, a network device may be a base station, an access point ("AP" for short), remote radio equipment ("RRE" for short), a remote radio head ("RRH" for short), a remote radio unit ("RRU" for short), a relay node ("RN" for short), or the like. The base station may be a base station ("BTS" for short) in GSM or CDMA, may also be a base station (NodeB, "NB" for short) in WCDMA, and may further be an evolved NodeB ("eNB" or "e-NodeB" for short) in LTE. It should also be understood that in the embodiments of the present invention, the network device may also be another device with a scheduling function, for example, UE with a scheduling function, and the embodiments of the present invention are not limited thereto.

Figure 1:
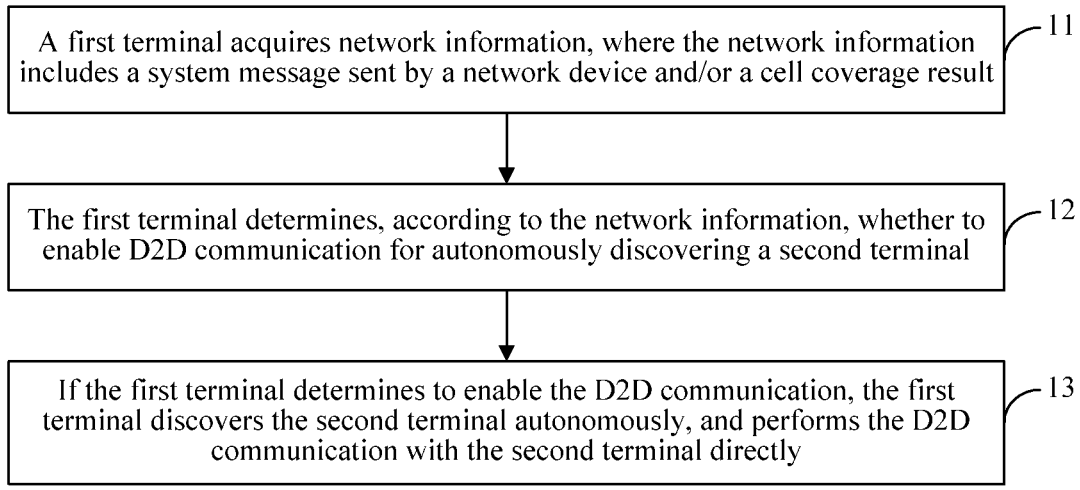
FIG. 1 is a schematic flowchart of an embodiment of a D2D communication method according to the present invention.

FIG. 1 is a schematic flowchart of an embodiment of a D2D communication method according to the present invention, including:

11: A first terminal acquires network information, where the network information includes a system message sent by a network device and/or a cell coverage result.

The system message may be a system information (SI), and the system message carries parameters used by a terminal to perform cell selection or reselection, access a network, send or receive data, and the like.

In different network systems, the terminal may be called differently, and in this embodiment of the present invention, user equipment (UE) is used as an example.

Optionally, the UE may acquire network information in the following manner: the UE discovers a cell, and receives a system message sent by the cell, where the system message may be broadcast by a base station; or the UE acquires a cell coverage result, where the coverage result may be a result of discovering the cell by the UE or a result of measuring a signal of the cell by the UE.

12: The first terminal determines, according to the network information, whether to enable D2D communication for autonomously discovering a second terminal (briefly referred to as D2D communication in the following).

In an embodiment, if the network information is a system message, the UE may determine, according to information carried in the system message, whether to enable D2D communication.

The information carried in the system message may be indication information used to indicate forbidding or enabling of D2D communication. When the system message carries indication information of forbidding D2D communication, the terminal may determine, according to the system message, to forbid enabling the D2D communication; and when the system message carries indication information of allowing D2D communication, the terminal may determine, according to the system message, to allow enabling of the D2D communication.

Alternatively, the information carried in the system message may be warning information. The warning information may include earthquake and tsunami warning system (ETWS) information and/or commercial mobile alert system (CMAS) information. When the system message carries the warning information, the terminal may determine, according to the system message, to allow enabling of D2D communication.

Alternatively, the information carried in the system message may also be resource information used for D2D communication. When the system message carries resource information used for D2D communication, the terminal may determine, according to the system message, to allow enabling of D2D communication.

Alternatively, the system message may carry other information, where the other information does not include indication information of allowing D2D communication, the warning information, and the resource information used for D2D communication. In this case, the terminal may determine, according to the system message, to forbid enabling D2D communication. In this embodiment, by acquiring information carried in a system message, network control on D2D communication is implemented, that is, the network can be controlled.

In an embodiment, if the network information is a cell coverage result, the cell coverage result is used to indicate whether the UE is located in a coverage vulnerability, and includes a result of discovering a cell by the UE or a result of measuring a signal of a cell by the UE. For example, when the UE cannot discover even one cell on all frequencies supported by the UE, it may indicate that the UE is located in a coverage vulnerability, and then it may be determined to enable D2D communication. Specifically, the discovering a cell means that the UE can acquire an identifier of the cell and get synchronized to the cell. Alternatively, when the result of measuring a signal of a cell in cells discovered on all supported frequencies by the UE indicates that a measurement result of a cell with a best measurement result is lower than a set threshold, or when the result of measuring a signal of a cell indicates that measurement results of all cells are lower than a set threshold, the UE determines to enable the D2D communication, where the measurement result includes signal strength and/or signal quality. Further, the result of discovering a cell by the UE may be a result of discovering a cell corresponding to a base station, where the result is acquired by the UE by measuring a detection signal sent by the base station. In this embodiment, the UE may acquire a cell coverage result by measuring a measurement signal sent by a base station, and the base station implements network control on D2D communication by sending the measurement signal, that is, a network can be controlled.

Further, the result of discovering a cell by the UE may be a result of discovering a cell corresponding to a base station, where the result is acquired by the UE by measuring a detection signal sent by the base station.

In another embodiment, if the network information is a cell coverage result and the discovery result indicates that the first terminal can discover the cell or the result of measuring a signal of the cell by the first terminal indicates that a measurement result of a cell with a best measurement result is higher than a set threshold, or the result of measuring a signal of the cell indicates that a measurement result of at least one cell is higher than a set threshold, the UE further acquires a system message, and determines, as indicated by the system message, whether to enable the D2D communication, as mentioned in the foregoing embodiment. In this embodiment, the UE may acquire a cell coverage result by measuring a measurement signal sent by a base station, and the base station implements network control on D2D communication by sending the measurement signal, that is, a network can be controlled.

In another embodiment, the network information includes a system message and a cell coverage result, and therefore, if a result of discovering a cell by the first terminal indicates that the first terminal can discover the cell, that is, the first terminal is located within coverage of the cell, the first terminal determines, according to the system message, whether to enable the D2D communication.

Alternatively, the cell coverage result includes a result of measuring a signal of a cell by the first terminal, and the measurement result includes signal strength and/or signal quality; and if the network information includes a system message and a cell coverage result, the determining, according to the network information, whether to enable D2D communication includes: if the result of measuring a signal of the cell by the first terminal indicates that a measurement result of a cell with a best measurement result is higher than a set threshold, or the result of measuring a signal of the cell indicates that a measurement result of at least one cell is higher than a set threshold, determining, by the first terminal according to the system message, whether to enable the D2D communication.

In this embodiment, the UE may acquire a cell coverage result by measuring a measurement signal sent by a base station, and the base station implements network control on D2D communication by sending the measurement signal, that is, a network can be controlled.

13: If the first terminal determines to enable the D2D communication, the first terminal discovers the second terminal autonomously, and performs the D2D communication with the second terminal directly.

That the first terminal performs the D2D communication with the second terminal directly may also refer to that the D2D communication is independent of a network and/or can be applied in a public security scenario, or the D2D communication is called pure D2D communication (pure D2D) or called direct D2D communication. Specifically, it means that a signal does not pass through a base station, or in other words, a communications link is established without participation of a base station, and neighbor discovery (a second terminal is discovered autonomously), communication resource negotiation, and the like can be performed between terminals.

The D2D communication may be unidirectional. For example, a terminal transmits a signal, and another terminal performs detection. Specifically, for example, in a case of a disaster relief, trapped UE intermittently transmits a D2D signal as a life signal characteristic, which is helpful in being found by rescue workers.

Alternatively, the D2D communication process may also be bidirectional, and may specifically include the following steps.

Step 1: Synchronize between UEs.

Step 2: UE performs discovery on a selected resource. It is assumed that first UE discovers second UE.

Step 3: The first UE pages the second UE, and the second UE returns a response message to the first UE that sends a paging message.

Step 4: The UEs that have undergone the paging process send data to each other. That is, the first UE and the second UE send data to each other.

Optionally, in the foregoing embodiment, before the first terminal determines, according to the network information, whether to enable the D2D communication for autonomously discovering a second terminal, the following may be further included: detecting, by the first terminal, a subscriber identity module of the terminal, and determining that the subscriber identity module can be detected. In this way, a problem caused by the fact that some users unplug the subscriber identity module intentionally to deceive a network and use D2D communication without permission can be avoided.

Figure 2:
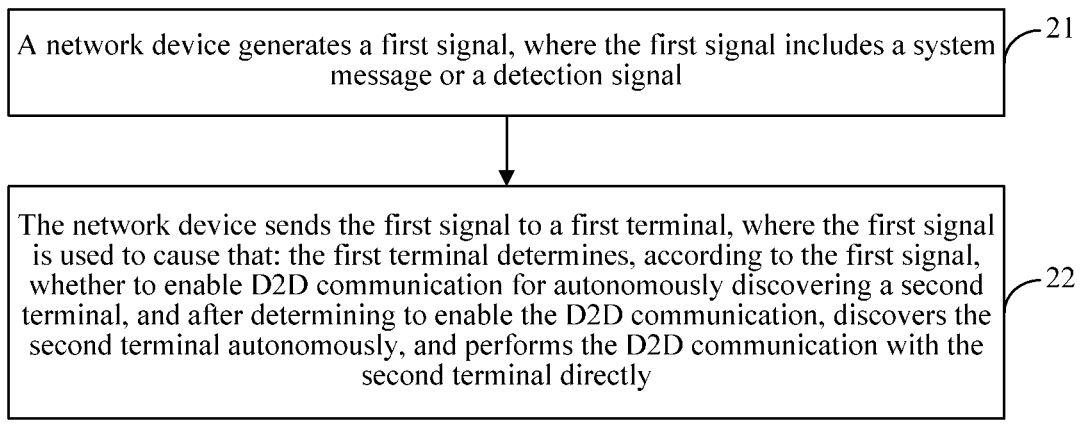
FIG. 2 is a schematic flowchart of another embodiment of a D2D communication method according to the present invention.

Correspondingly, referring to FIG. 2, the following steps may be performed on a network side:

21: A network device generates a first signal, where the first signal is a system message or a detection signal.

22: The network device sends the first signal to a first terminal, where the first signal is used to cause that: the first terminal determines, according to the first signal, whether to enable D2D communication for autonomously discovering a second terminal, and after determining to enable the D2D communication, discovers the second terminal autonomously, and performs the D2D communication with the second terminal directly.

The network device may be a base station, for example, an evolved base station (eNB).

For information carried in the system message, reference may be made to the foregoing description about the terminal side.

The detection signal may refer to a signal sent by a base station to a terminal and used for cell discovery or signal measurement, for example, a primary synchronization signal (PSS), a secondary synchronization signal (SSS), a cell-specific reference signal (CRS), a channel state information reference signal (CSI-RS), or any other signal that can be used for discovery or measurement.

In this embodiment, network information is used to determine whether to enable D2D communication, so as to implement that a network can be controlled, and ensure operator benefits. In addition, during D2D communication, communication is performed between terminals directly. That is, after the terminal determines to enable D2D communication, neighbor discovery (a second terminal is discovered autonomously), communication resource negotiation, and the like can be performed between terminals, and a network is not required to indicate resource discovery and communication resources any more, which can solve a problem that a base station cannot provide support in a disaster scenario. Therefore, the D2D communication is still applicable in a public security scenario, and meets a requirement of timely rescue.

In another embodiment of the present invention, UE may detect its own subscriber identity module and generate a detection result. If the subscriber identity module cannot be detected, the UE determines to forbid D2D communication.

The subscriber identity module may include a subscriber identity module (SIM), a user identity module (UIM), or a universal subscriber identity module (USIM). For example, the UE may learn whether there is a SIM card in the UE.

In this embodiment, D2D communication is forbidden when no subscriber identity module is detected in the UE, which can avoid a problem caused by the fact that some users unplug the subscriber identity module intentionally to deceive the network and use D2D communication without permission.

Figure 3:
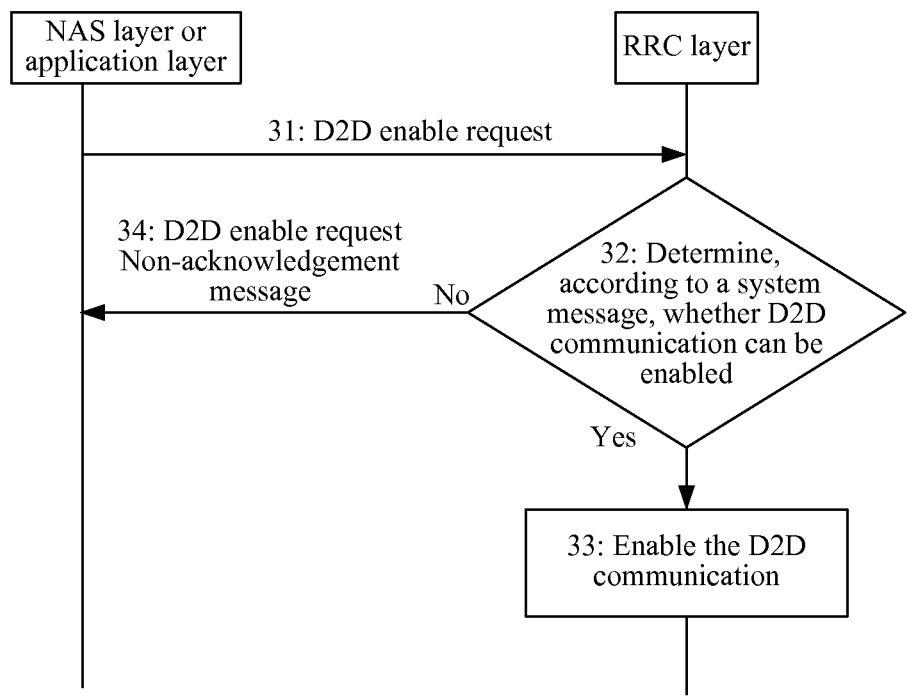
FIG. 3 is a schematic flowchart of still another embodiment of a D2D communication method according to the present invention.

FIG. 3 is a schematic flowchart of another embodiment of a D2D communication method according to the present invention, including the following steps.

31: A non-access stratum (NAS) layer or an application layer of UE sends a D2D enable request to a radio resource control (RRC) layer.

32: After the RRC layer receives the D2D enable request, if a system message sent by a cell can be received, the RRC layer determines, according to the system message, whether to enable D2D communication. If the RRC layer determines to enable the D2D communication, perform step 33; otherwise, perform step 34.

The system message may be acquired by the UE by performing a cell selection process. The cell selection process performed by the UE may include the following steps.

First, by searching for a synchronization channel, the UE may acquire a cell identifier and get synchronized to a cell.

Second, the UE measures a cell reference signal and reads a system message of the cell.

In this process, if the UE discovers any of the following cells, it indicates that the UE can receive a system message of the cell.

(1) A Suitable Cell is Discovered and Camped on:

When a cell meets the following conditions, it indicates that a suitable cell is discovered: a PLMN indicated by public land mobile network (PLMN) information carried in a system message broadcast by the cell is a PLMN selected by the UE, or is a PLMN registered for the UE, or is in an equivalent PLMN list of the UE; for a cell of a closed subscriber group (CSG), a CSG ID carried in a system message broadcast by the cell is in a CSG white list of the UE; the cell is not forbidden; a tracking area (TA) to which the cell belongs is not a tracking area in which roaming is forbidden; and a signal of the cell meets a cell selection criterion, where that the signal of the cell meets the cell selection criterion includes: signal strength of the cell and/or signal quality of the cell meets the cell selection criterion.

(2) An Acceptable Cell is Discovered:

When the UE cannot discover a suitable cell, meeting the foregoing conditions, for camping on, but can discover a cell to acquire restricted services, such as at least one of the following items: emergency call, ETWS, and CMAS, the cell is called an acceptable cell, where the acceptable cell should meet the following two conditions: the cell is not forbidden; and signal quality of the cell meets a cell selection criterion.

(3) A Reserved Cell is Discovered.

A system message sent by the cell may carry information that is used to indicate that the cell is a reserved cell, and the UE may determine, according to the information, whether the cell is a reserved cell.

The reserved cell may be reserved for testers of an operator, where other staff cannot access the reserved cell.

(4) A Forbidden Cell is Discovered.

A system message sent by the cell may carry information that is used to indicate that the cell is a forbidden cell, and the UE may determine, according to the information, whether the cell is a forbidden cell.

The forbidden cell may refer to a cell that is set as forbidden in a network deployment or optimization stage, where all UEs cannot access the forbidden cell, because no service can be acquired even if the UE accesses the cell.

When the system message carries either of the following information, it indicates that the D2D communication cannot be enabled: indication information of forbidding D2D communication is carried; or no indication information of forbidding D2D communication is carried, but only a system message is broadcast, where the system message does not include indication information of allowing D2D communication, ETWS information, CMAS information, and D2D communication resource information.

When the system message carries any one of the following information, it indicates that the D2D communication can be enabled: indication information of allowing D2D communication is carried; warning information is carried, where the warning information includes ETWS information and/or CMAS information; and resource information used for D2D communication is carried, where the resource information may be a subframe, a frequency domain resource block, or a time-frequency resource block, where indication information used for D2D communication may be carried while the resource information is carried; or, it may be pre-agreed which resource information is resource information used for D2D communication, and when the system message carries the pre-agreed resource information, the UE may determine to enable D2D communication.

Understandably, after it is determined, according to at least one of the foregoing information, to enable the D2D communication, the resource information required by the D2D communication may be the foregoing resource information carried in the system message, or may be resource information pre-agreed by both parties of communication and does not need to be carried in the system message.

33: The RRC layer sends a D2D enable request acknowledgement message to the NAS layer or the application layer, and the NAS layer or the application layer or the RRC layer triggers the UE to enable the D2D communication, or enable the D2D communication on a D2D communication resource.

Figure 4:
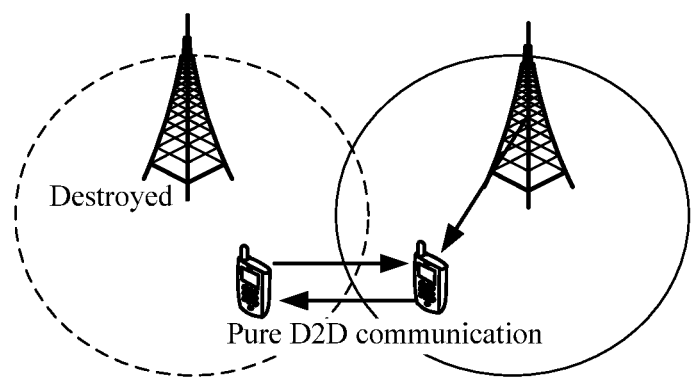
FIG. 4 is a schematic structural diagram of D2D communication according to an embodiment of the present invention.

As shown in FIG. 4, after determining, according to a system message, to enable D2D communication, UE on a right side may discover neighboring UE such as UE that is on a left side and located in coverage of a destroyed base station. Subsequently, two UEs may perform pure D2D communication, so as to perform timely rescue on the UE on the left side.

Optionally, when the RRC layer triggers the UE to enable D2D communication or enable D2D communication on the D2D communication resource, the RRC layer may send no D2D enable request acknowledgement message to the NAS layer or the application layer.

34: The RRC layer sends a D2D enable request non-acknowledgement message to the NAS layer or the application layer, and the NAS layer or the application layer or the RRC layer forbids the UE to enable D2D communication.

The D2D communication in step 33 and step 34 is communication performed between terminals directly, where the D2D communication is independent of a network and/or can be applied in a public security scenario, and may be called D2D communication independent of a network or pure D2D communication.

Optionally, when the RRC layer forbids the UE to enable D2D communication, the RRC layer may send no D2D enable request non-acknowledgement message to the NAS layer or the application layer.

In addition, when the RRC layer cannot receive the system message, a cell coverage result may be further acquired. For specific content, reference may be made to subsequent embodiments.

In this embodiment, a base station sends a system message to UE, and the UE determines, according to the system message, whether to enable D2D communication, thereby implementing that a network can be controlled. In addition, pure D2D communication is performed after the UE determines the D2D communication. Dependence on a network is avoided, and the D2D communication can be applied in a disaster scenario.

Figure 5:
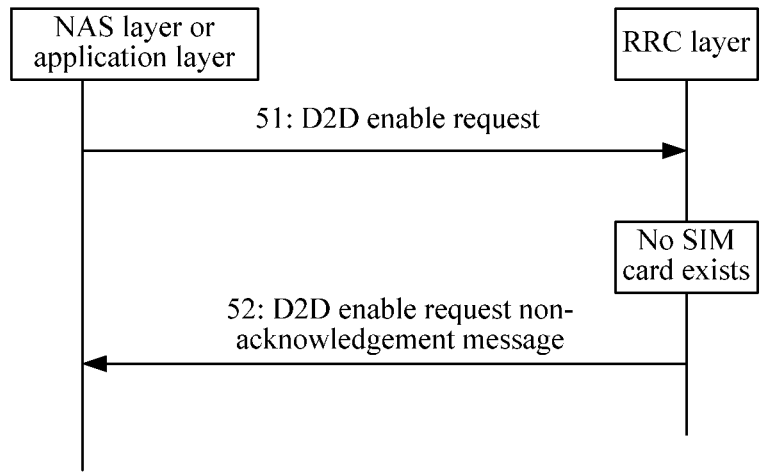
FIG. 5 is a schematic flowchart of yet another embodiment of a D2D communication method according to the present invention.

FIG. 5 is a schematic flowchart of another embodiment of a D2D communication method according to the present invention, including the following steps.

51: A NAS layer or an application layer of UE sends a D2D enable request to an RRC layer of the UE.

52: After the RRC layer receives the D2D enable request, if there is no SIM card in the UE, the RRC layer sends a D2D enable request non-acknowledgement message to the NAS layer or the application layer, and the NAS layer or the application layer or the RRC layer forbids the UE to enable D2D communication.

Optionally, when the RRC layer forbids the UE to enable D2D communication, the RRC layer may send no D2D enable request non-acknowledgement message to the NAS layer or the application layer.

In this embodiment, an example is used in which a subscriber identity module is a SIM card. Understandably, the subscriber identity module may also be a UIM, a USIM, or the like.

The D2D communication is communication performed between terminals directly, is independent of a network and/or can be applied in a public security scenario, and may be called D2D communication independent of a network or pure D2D communication.

In addition, when there is a SIM card in the UE, pure D2D communication may be enabled or forbidden according to whether a system message is received and according to indication information in the system message.

In this embodiment, D2D communication is forbidden when there is no SIM card in the UE, which avoids a problem caused by the fact that certain users unplug a SIM card intentionally to deceive a network and use D2D communication without permission.

Figure 6:
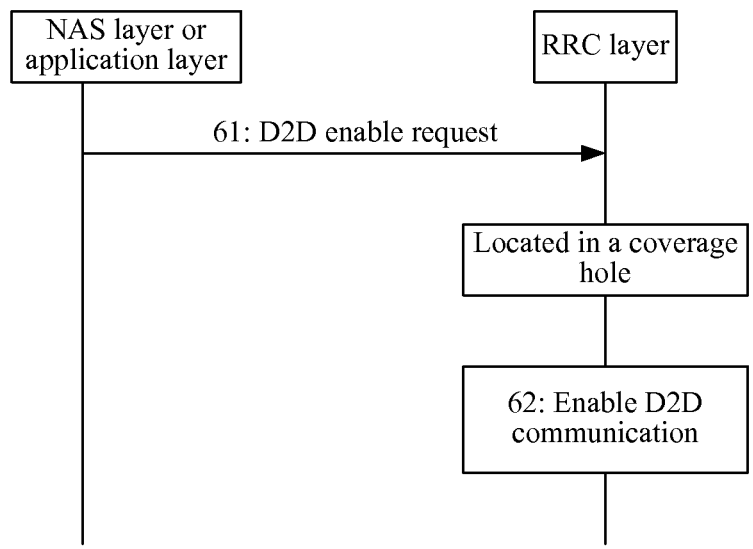
FIG. 6 is a schematic flowchart of still yet another embodiment of a D2D communication method according to the present invention.

FIG. 6 is a schematic flowchart of another embodiment of a D2D communication method according to the present invention, including the following steps.

61: A NAS layer or an application layer of UE sends a D2D enable request to an RRC layer.

62: After receiving the D2D enable request, the RRC layer acquires a cell coverage result. If the coverage result indicates that the UE is located in a coverage vulnerability, the RRC layer sends a D2D enable request acknowledgement message to the NAS layer or the application layer, and the NAS layer or the application layer or the RRC layer triggers the UE to enable D2D communication.

Optionally, when the RRC layer triggers the UE to enable D2D communication, the RRC layer may send no D2D enable request acknowledgement message to the NAS layer or the application layer.

The D2D communication is communication performed between terminals directly, is independent of a network and/or can be applied in a public security scenario, and may be called D2D communication independent of a network or pure D2D communication. When the following conditions are met, it indicates that the UE is located in a coverage vulnerability:

The coverage result is a result of discovering a cell by the UE. In this case, when the UE cannot discover even one cell on all frequencies supported by the UE, it indicates that the UE is located in a coverage vulnerability. Specifically, the discovering a cell means that the UE acquires an identifier of the cell and gets synchronized to the cell.

Alternatively, the coverage result is a result of measuring a signal of a cell by the UE. In this case, when signal quality of a cell with best signal quality in cells discovered on all supported frequencies by the UE is lower than a set threshold or signal quality of all cells is lower than a set threshold, it indicates that the UE is located in a coverage vulnerability. Optionally, the "signal quality" may be replaced with "signal strength" or a combination thereof, that is, both signal quality and signal strength are measured. Specifically, for that signal strength and/or signal quality of a cell with best signal strength and/or signal quality or signal strength and/or signal quality of all cells is lower than a set threshold, there are two measurement methods: the RRC layer measures a signal of a cell to discover that signal strength and/or signal quality of the cell is lower than the set threshold; or a physical layer measures a signal of a cell to discover that a physical-layer measurement value of the cell is lower than a set threshold, where the measurement value is signal strength and/or signal quality, and the physical layer sends an indication to the RRC layer, where the indication is used to notify the RRC layer that the UE is located in a coverage vulnerability of a base station.

The signal of the cell may be a cell-specific reference signal (CRS), may be a channel status information reference signal (CSI-RS), or may be any other reference signal that may be used for measurement. The signal strength may be reference signal receiving power (RSRP), and the signal quality may be reference signal receiving quality (RSRQ).

Figure 7:
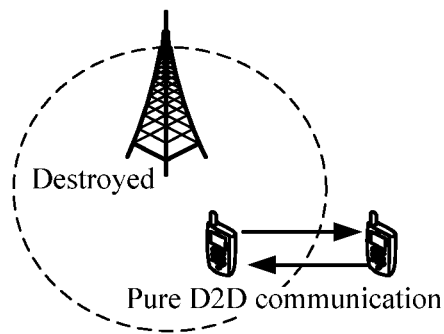
FIG. 7 is a schematic structural diagram of D2D communication according to an embodiment of the present invention.

As shown in FIG. 7, UE that is on a left side and located in coverage of a destroyed base station can perform pure D2D communication with UE on a right side after discovering, through measurement, that the UE itself is located in a coverage vulnerability, so as to ensure timely rescue for the UE.

In addition, when the UE is not located in a coverage vulnerability, D2D communication independent of a network may be enabled or forbidden according to a system message or a situation of a SIM card. For specific content, reference may be made to the foregoing embodiment.

In this embodiment, according to a cell coverage result, timely rescue for oneself can be ensured in a disaster scenario.

Figure 8:
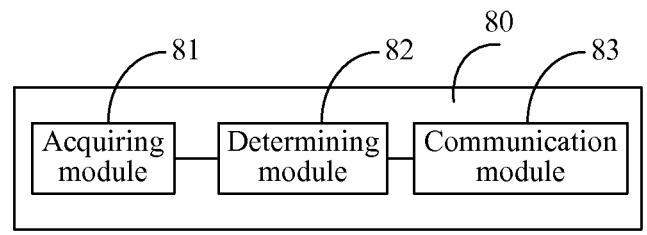
FIG. 8 is a schematic structural diagram of an embodiment of a terminal according to the present invention.

FIG. 8 is a schematic structural diagram of an embodiment of a terminal according to the present invention. The terminal may specifically be a first terminal, and the terminal 80 includes an acquiring module 81, a determining module 82, and a communication module 83. The acquiring module 81 is configured to acquire network information, where the network information includes a system message sent by a network device and/or a cell coverage result. The determining module 82 is configured to determine, according to the network information acquired by the acquiring module 81, whether to enable D2D communication for autonomously discovering a second terminal. The communication module 83 is configured to: after the determining module 82 determines to enable the D2D communication, discover the second terminal autonomously, and perform the D2D communication with the second terminal directly.

Optionally, if the network information includes the system message, the determining module 82 is specifically configured to determine, in the following manner, whether to enable device-to-device D2D communication: if the system message includes indication information of forbidding the D2D communication or none of the following items is included in the system message: indication information of allowing the D2D communication, warning information, and resource information of the D2D communication, determining to forbid enabling the D2D communication; or if the system message includes at least one of the following items: indication information of allowing the D2D communication, resource information of the D2D communication, and warning information, determining to enable the D2D communication.

Optionally, the cell coverage result includes a result of discovering a cell by the first terminal; and if the network information further includes the cell coverage result, the determining module 82 is specifically configured to determine, in the following manner and according to the network information, whether to enable D2D communication: if the result of discovering a cell by the first terminal indicates that the first terminal can discover the cell, determining, according to the system message, whether to enable the D2D communication; and/or the cell coverage result includes a result of measuring a signal of a cell by the first terminal, and the measurement result includes signal strength and/or signal quality; and if the network information further includes the cell coverage result, the determining module 82 is specifically configured to determine, in the following manner and according to the network information, whether to enable D2D communication: if the measurement result indicates that a measurement result of a cell with a best measurement result is higher than a set threshold, or the measurement result indicates that a measurement result of at least one cell is higher than a set threshold, determining, according to the system message, whether to enable the D2D communication.

Optionally, the warning information included in the system message acquired by the acquiring module 81 includes: ETWS information and/or CMAS information.

Optionally, if the network information includes the cell coverage result, the determining module 82 is specifically configured to determine, in the following manner, whether to enable device-to-device D2D communication: if the cell coverage result includes a result of discovering a cell by the first terminal, and if the result of discovering a cell by the first terminal indicates that the first terminal cannot discover the cell on all frequencies supported by the first terminal, determining to enable the D2D communication; and/or if the cell coverage result includes a result of measuring a signal of a cell by the first terminal, and the measurement result includes signal strength and/or signal quality, and if the result of measuring a signal of the cell by the first terminal indicates that a measurement result of a cell with a best measurement result is lower than a set threshold, or the result of measuring a signal of the cell indicates that measurement results of all cells are lower than a set threshold, determining to enable the D2D communication.

Optionally, the determining module 82 is further configured to: before determining whether to enable the D2D communication, detect a subscriber identity module of the first terminal, and determine that the subscriber identity module can be detected.

Optionally, the terminal further includes an RRC entity module, where the RRC entity module includes the acquiring module 81; and a NAS entity module, configured to generate a D2D enable request, where the acquiring module 81 is specifically configured to acquire the network information in the following manner: acquiring the network information after receiving the D2D enable request generated by the NAS entity module; or an application layer entity module, configured to generate a D2D enable request, where the acquiring module 81 is specifically configured to acquire the network information in the following manner: acquiring the network information after receiving the D2D enable request generated by the application layer entity module.

Optionally, the RRC entity module further includes the determining module, where the determining module 82 is specifically configured to: after determining to forbid enabling the D2D communication, forbid the communication module 83 to enable the D2D communication.

Alternatively, the determining module 82 is further configured to: if the determining module 82 determines to forbid enabling the D2D communication and if the D2D enable request is sent by the NAS entity unit, the determining module 82 sends a D2D enable request non-acknowledgement message to the NAS entity module; the NAS entity module is further configured to: after receiving the D2D enable request non-acknowledgement message, forbid the communication module 83 to enable the D2D communication; or the determining module 82 is further configured to: if the determining module 82 determines to forbid enabling the D2D communication and if the D2D enable request is sent by the application layer entity module, the determining module 82 sends a D2D enable request non-acknowledgement message to the application layer entity module; and the application layer entity module is configured to: after receiving the D2D enable request non-acknowledgement message, forbid the communication module 83 to enable the D2D communication.

The RRC entity module further includes the determining module 82, where the determining module 82 is specifically configured to: after determining to enable the D2D communication, trigger the communication module 83 to enable the D2D communication.

Alternatively, the determining module 82 is further configured to: if the determining module 82 determines to enable the D2D communication and if the D2D enable request is sent by the NAS entity module, the determining module 82 sends a D2D enable request acknowledgement message to the communication module, so that the communication module 83 triggers enabling of the D2D communication; or the determining module 82 is further configured to: if the determining module 82 determines to enable the D2D communication and if the D2D enable request is sent by the application layer entity module, the determining module 82 sends a D2D enable request acknowledgement message to the communication module, so that the communication module 83 triggers enabling of the D2D communication.

In another embodiment, the determining module is configured to detect a subscriber identity module of a terminal, determine that the subscriber identity module cannot be detected, and determine to forbid the communication module to enable the D2D communication. This embodiment may be used separately, or may be used in combination with the foregoing embodiment.

For hardware implementation, the foregoing modules may be embedded in or independent of a processor of a base station in a hardware form, or may be stored in a terminal, such as a memory of UE, in a software form, so as to facilitate the processor in invoking and performing operations corresponding to each of the foregoing modules. The processor may be a central processing unit (CPU), a microprocessor, a single-chip microcomputer, or the like. The terminal shown in FIG. 8 can perform corresponding steps in the foregoing embodiment. For details, reference may be made to the description in the foregoing embodiment. For effects thereof, reference may also be made to the description in the foregoing embodiment.

Figure 9A:
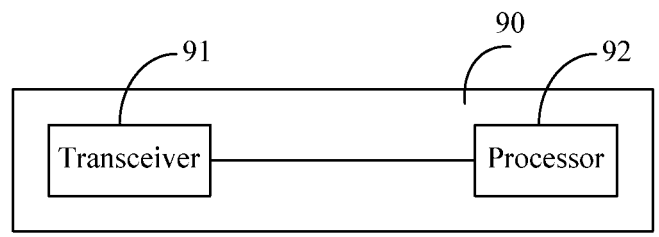
FIG. 9a is a schematic structural diagram of another embodiment of a terminal according to the present invention.

Refer to FIG. 9a, which is a schematic structural diagram of a terminal according to an embodiment of the present invention. As shown in the figure, the terminal 90 includes a transceiver 91 and a processor 92. Certainly, the terminal may further include general-purpose components such as a memory, an antenna, a baseband processing component, an intermediate-frequency and radio-frequency processing component, and an input/output apparatus, which are not limited herein in this embodiment of the present invention.

The processor 92 is configured to acquire network information, where the network information includes a system message sent by a network device and/or a cell coverage result; configured to determine, according to the network information, whether to enable D2D communication for autonomously discovering a second terminal; and configured to: after determining to enable the D2D communication, enable the D2D communication, discover the second terminal autonomously, and control the transceiver 91 to perform the D2D communication with the second terminal directly; and the transceiver 91 is configured to perform the D2D communication with the second terminal directly under control of the processor 92.

Optionally, if the network information includes the system message, the processor 92 is specifically configured to determine, in the following manner, whether to enable D2D communication: if the system message includes indication information of forbidding the D2D communication or none of the following items is included in the system message: indication information of allowing the D2D communication, warning information, and resource information of the D2D communication, determining to forbid enabling the D2D communication; or if the system message includes at least one of the following items: indication information of allowing the D2D communication, resource information of the D2D communication, and warning information, determining to enable the D2D communication.

Optionally, the cell coverage result includes a result of discovering a cell by the first terminal; and if the network information further includes the cell coverage result, the processor 92 is specifically configured to determine, in the following manner and according to the network information, whether to enable D2D communication: if the discovery result indicates that the first terminal can discover the cell, determining, according to the system message, whether to enable the D2D communication; and/or the cell coverage result includes a result of measuring a signal of a cell by the first terminal, and the measurement result includes signal strength and/or signal quality; and if the network information further includes the cell coverage result, the processor 92 is specifically configured to determine, in the following manner and according to the network information, whether to enable D2D communication: if the result of measuring a signal of the cell by the first terminal indicates that a measurement result of a cell with a best measurement result is higher than a set threshold, or the result of measuring a signal of the cell indicates that a measurement result of at least one cell is higher than a set threshold, determining, according to the system message, whether to enable the D2D communication.

Optionally, the warning information acquired by the processor 92 includes: earthquake and tsunami warning system ETWS information and/or commercial mobile alert system CMAS information.

Optionally, if the network information includes the cell coverage result, the processor 92 is specifically configured to determine, in the following manner, whether to enable D2D communication: if the cell coverage result includes a result of discovering a cell by the first terminal and the result of discovering a cell by the first terminal indicates that the first terminal cannot discover the cell on all frequencies supported by the first terminal, determining to enable the D2D communication; and/or if the cell coverage result includes a result of measuring a signal of a cell by the first terminal, and the measurement result includes signal strength and/or signal quality, and if the result of measuring a signal of the cell by the first terminal indicates that a measurement result of a cell with a best measurement result is lower than a set threshold, or the result of measuring a signal of the cell indicates that measurement results of all cells are lower than a set threshold, determining to enable the D2D communication.

Optionally, the processor 92 is further configured to: before determining whether to enable the D2D communication, detect a subscriber identity module of the first terminal, and determine that the subscriber identity module can be detected.

Figure 9B:
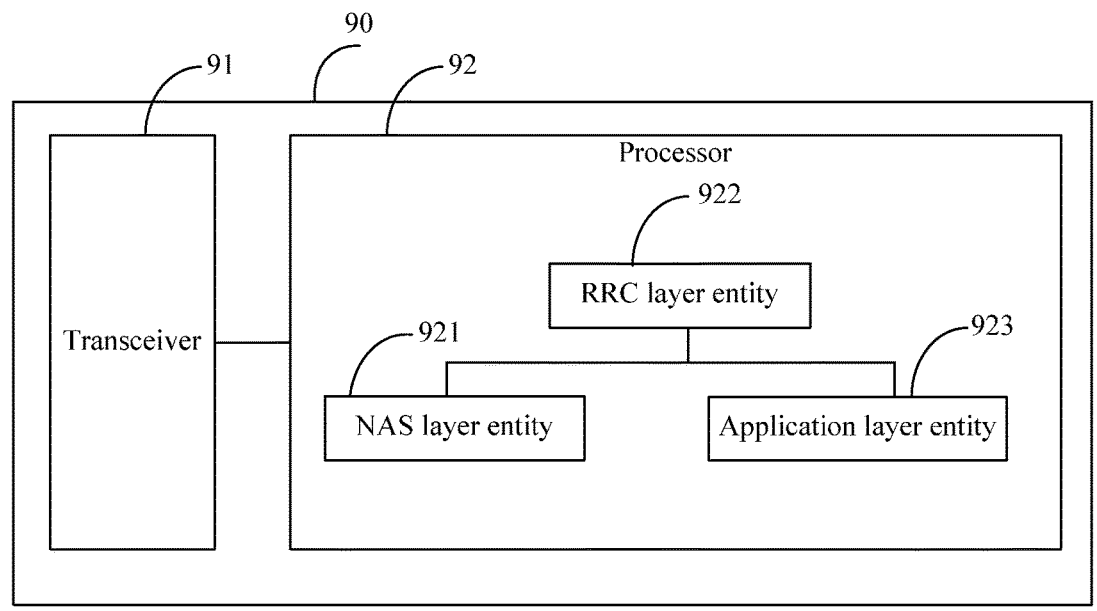
FIG. 9b is a schematic structural diagram of still another embodiment of a terminal according to the present invention.

Optionally, as shown in FIG. 9b, the processor 92 includes a NAS layer entity 921, an RRC layer entity 922, and an application layer entity 923, where the NAS layer entity 921 is configured to generate a D2D enable request; and the RRC layer entity 922 is configured to acquire the network information after receiving the D2D enable request sent by the NAS layer entity 921; or the application layer entity 923 is configured to generate a D2D enable request; and the RRC layer entity 922 is configured to acquire the network information after receiving the D2D enable request sent by the application layer entity.

Optionally, the RRC layer entity 922 is further configured to: if it is determined to forbid enabling the D2D communication and if the D2D enable request is sent by the NAS layer entity, send a D2D enable request non-acknowledgement message to the NAS layer entity 921; and the NAS layer entity is further configured to forbid enabling the D2D communication; or the RRC layer entity 922 is further configured to: if it is determined to forbid enabling the D2D communication and if the D2D enable request is sent by the application layer entity, send a D2D enable request non-acknowledgement message to the application layer entity 923; and the application layer entity 923 forbids enabling the D2D communication; or the RRC layer entity 922 is further configured to: after it is determined to forbid enabling the D2D communication, forbid enabling the D2D communication.

Optionally, the RRC layer entity 922 is further configured to: if it is determined to enable the D2D communication and if the D2D enable request is sent by the NAS layer entity 921, send a D2D enable request acknowledgement message to the NAS layer entity 921; and the NAS layer entity 921 is further configured to trigger enabling of the D2D communication; or the RRC layer entity 922 is further configured to: if it is determined to enable the D2D communication and if the D2D enable request is sent by the application layer entity 923, send a D2D enable request acknowledgement message to the application layer entity 923; and the application layer entity 923 is further configured to trigger enabling of the D2D communication; or the RRC layer entity 922 is further configured to trigger enabling of the D2D communication if it is determined to enable the D2D communication.

It should be noted that the devices shown in FIG. 8, FIG. 9a, and FIG. 9b may be configured to implement any method, in which a terminal is involved, provided in the foregoing method embodiments; descriptions about network information, a manner of acquiring the network information, D2D communication, and the like are the same as those in the foregoing method embodiments, and details are not described herein again.

In this embodiment, whether to enable D2D communication is determined according to network information, so as to implement that a network can be controlled, and ensure operator benefits; in addition, during D2D communication, communication is performed between terminals directly, which can solve a problem that a base station cannot provide support in a disaster scenario. Therefore, the D2D communication is still applicable in a public security scenario, and meets a requirement of timely rescue.

Figure 10:
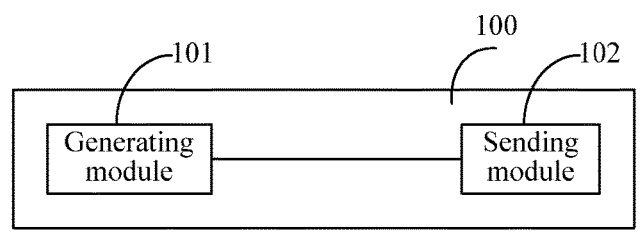
FIG. 10 is a schematic structural diagram of an embodiment of a network device according to the present invention.

FIG. 10 is a schematic structural diagram of an embodiment of a network device according to the present invention. The network device 100 includes a generating module 101 and a sending unit 102. The generating module 101 is configured to generate a first signal, where the first signal includes a system message or a detection signal. The sending module 102 is configured to send the first signal generated by the generating module to a first terminal, where the first signal is used to cause that: the first terminal determines, according to the first signal, whether to enable device-to-device D2D communication, and after determining to enable the D2D communication, enables the D2D communication, discovers a second terminal autonomously, and performs the D2D communication with the second terminal directly.

Optionally, if the first signal generated by the generating module includes the system message, the system message carries indication information of forbidding the D2D communication or none of the following items is included in the system message: indication information of allowing the D2D communication, warning information, and resource information of the D2D communication, where the system message is used to cause the first terminal to determine, according to the system message, to forbid enabling the D2D communication; or the system message includes at least one of the following items: indication information of allowing the D2D communication, resource information of the D2D communication, and warning information, where the system message is used to cause the first terminal to determine, according to the system message, to enable the D2D communication.

Optionally, the warning information included in the system message generated by the generating module includes: ETWS information and/or CMAS information.

Optionally, the first signal generated by the generating module includes the detection signal, which is used to cause the first terminal to use the detection signal to perform cell discovery or measure the detection signal, and determine, according to a cell discovery result, whether to enable the D2D communication, or determine, according to a measurement result of the detection signal, whether to enable the D2D communication.

For hardware implementation, the foregoing sending module may be a transmitter or a transceiver. Corresponding to the hardware implementation, a transceiver is used. The foregoing generating module may be embedded in or independent of a processor of a base station in a hardware form, or may be stored in a network device, such as a memory of a base station, in a software form, so as to facilitate the processor in invoking and performing operations corresponding to each of the foregoing modules. The processor may be a central processing unit (CPU), a microprocessor, a single-chip microcomputer, or the like.

Figure 11:
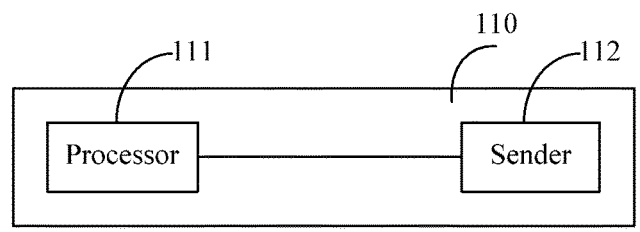
FIG. 11 is a schematic structural diagram of another embodiment of a network device according to the present invention.

Refer to FIG. 11, which is a schematic structural diagram of a network device according to an embodiment of the present invention. As shown in the figure, the network device 110 includes a processor 111 and a sender 112. Certainly, the network device may further include general-purpose components such as a memory, a receiver, an antenna, a baseband processing component, an intermediate-frequency and radio-frequency processing component, and an input/output apparatus, and the sender and the receiver may be combined as a transceiver, which are not limited herein in this embodiment of the present invention.

The processor 111 is configured to generate a first signal, where the first signal includes a system message or a detection signal; and the sender 112 is configured to send the first signal generated by the processor to a first terminal, where the first signal is used to cause that: the first terminal determines, according to the first signal, whether to enable device-to-device D2D communication, and after determining to enable the D2D communication, enables the D2D communication for autonomously discovering a second terminal, and discovers the second terminal autonomously, so that the first terminal performs the D2D communication with the second terminal directly.

Optionally, the first signal includes the system message; the system message sent by the sender 112 carries indication information of forbidding the D2D communication or none of the following items is included in the system message: indication information of allowing the D2D communication, warning information, and resource information of the D2D communication, where the system message is used to cause the first terminal to determine, according to the system message, to forbid enabling the D2D communication; or the system message sent by the sender 112 includes at least one of the following items: indication information of allowing the D2D communication, resource information of the D2D communication, and warning information, where the system message is used to cause the first terminal to determine, according to the system message, to enable the D2D communication.

Optionally, the warning information included in the system message sent by the sender 112 includes: ETWS information and/or CMAS information.

Optionally, the first signal sent by the sender 112 includes the detection signal, which is used to cause the first terminal to use the detection signal to perform cell discovery or measure the detection signal, and determine, according to a cell discovery result, whether to enable the D2D communication, or determine, according to a measurement result of the detection signal, whether to enable the D2D communication.

It should be noted that the devices shown in FIG. 10 and FIG. 11 may be configured to implement any method, in which a network device is involved, provided in the foregoing method embodiments; descriptions about a system message, a detection signal, manners of acquiring the system message and the detection signal, D2D communication, and the like are the same as those in the foregoing method embodiments, and details are not described herein again.

In this embodiment, whether to enable D2D communication is determined according to network information, so as to implement that a network can be controlled, and ensure operator benefits; in addition, during D2D communication, communication is performed between terminals directly, which can solve a problem that a base station cannot provide support in a disaster scenario. Therefore, the D2D communication is still applicable in a public security scenario, and meets a requirement of timely rescue.

It may be clearly understood by persons skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A device-to-device (D2D) communication method, comprising: acquiring, by a first terminal, network information, wherein the network information comprises a system message sent by a network device, wherein the network device is a separate device from the first terminal; determining, by the first terminal according to the network information, whether to enable D2D communication for autonomously discovering a second terminal, the determining comprising: determining, by the first terminal, to forbid enabling the D2D communication in response to the system message comprising indication information of forbidding the D2D communication or none of the following items being comprised in the system message: indication information of allowing the D2D communication, warning information, and resource information of the D2D communication; and determining, by the first terminal, to enable the D2D communication in response to the system message comprising indication information of allowing the D2D communication, resource information of the D2D communication, or warning information; when a cell coverage result comprises a result of measuring a signal of a cell by the first terminal, and the measurement result comprises signal strength and/or signal quality, determining to enable the D2D communication in response to the result of measuring the signal of the cell by the first terminal indicating that a measurement result of a cell with a best measurement result is lower than a set threshold, or the result of measuring the signal of the cell indicating that measurement results of all cells are lower than a set threshold; and discovering, by the first terminal, the second terminal autonomously, in response to the first terminal determining to enable the D2D communication, and performing the D2D communication with the second terminal.

2. The method according to claim 1, wherein
the network information further comprises a cell coverage result, the cell coverage result comprises a result of discovering a cell by the first terminal, and the determining, according to the network information, whether to enable D2D communication for autonomously discovering a second terminal further comprises: determining, by the first terminal according to the system message, whether to enable the D2D communication in response to the result of discovering a cell by the first terminal indicating that the first terminal can discover the cell; and/or
the network information further comprises the cell coverage result, the cell coverage result comprises a result of measuring a signal of a cell by the first terminal, the measurement result comprising signal strength and/or signal quality, and the determining, according to the network information, whether to enable D2D communication for autonomously discovering a second terminal comprises: determining, by the first terminal according to the system message, whether to enable the D2D communication in response to the result of measuring a signal of the cell by the first terminal indicating that a measurement result of a cell with a best measurement result is higher than a set threshold, or the result of measuring a signal of the cell indicating that a measurement result of at least one cell is higher than a set threshold.

3. The method according to claim 1, wherein the warning information comprises:
earthquake and tsunami warning system (ETWS) information and/or commercial mobile alert system (CMAS) information.

4. The method according to claim 1, wherein:
the cell coverage result comprises a result of discovering a cell by the first terminal, and in response to the network information comprising the cell coverage result, the determining, according to the network information, whether to enable D2D communication for autonomously discovering a second terminal comprises: determining, by the first terminal, to enable the D2D communication in response to the result of discovering a cell by the first terminal indicating that the first terminal cannot discover the cell on all frequencies supported by the first terminal; and/or
the network information comprises the cell coverage result, the cell coverage result comprises a result of measuring a signal of a cell by the first terminal, and the measurement result comprises signal strength and/or signal quality; and the determining, according to the network information, whether to enable D2D communication comprises: determining, by the first terminal, to enable the D2D communication in response to the result of measuring a signal of the cell by the first terminal indicating that a measurement result of a cell with a best measurement result is lower than a set threshold, or the result of measuring a signal of the cell indicating that measurement results of all cells are lower than a set threshold.

5. The method according to claim 1, the method further comprising:
detecting, by the first terminal, a subscriber identity module of the first terminal, and determining that the subscriber identity module can be detected.

6. The method according to claim 1, wherein the acquiring, by a first terminal, network information comprises:
after a radio resource control (RRC) layer of the first terminal receives a D2D enable request sent by a non-access stratum (NAS) layer or an application layer of the first terminal, acquiring, by the RRC layer, the network information.

7. The method according to claim 6, wherein
the determining, by the first terminal according to the network information, whether to enable D2D communication for autonomously discovering a second terminal comprises determining, by the RRC layer according to the network information, to forbid enabling the D2D communication; and
the method further comprises:
sending, by the RRC layer, a D2D enable request non-acknowledgement message to the NAS layer in response to the D2D enable request being sent by the NAS layer, and forbidding, by the NAS layer, the first terminal to enable the D2D communication; or
sending, by the RRC layer, a D2D enable request non-acknowledgement message to the application layer in response to the D2D enable request being sent by the application layer, and forbidding, by the application layer, the first terminal to enable the D2D communication; or
forbidding, by the RRC layer, the first terminal to enable the D2D communication.

8. The method according to claim 6, wherein
the determining, by the first terminal according to the network information, whether to enable D2D communication for autonomously discovering a second terminal comprises: determining, by the RRC layer according to the network information, to enable the D2D communication, and the enabling, by the first terminal, the D2D communication comprises:
sending, by the RRC layer, a D2D enable request acknowledgement message to the NAS layer in response to the D2D enable request being sent by the NAS layer, and triggering, by the NAS layer, the first terminal to enable the D2D communication; or
sending, by the RRC layer, a D2D enable request acknowledgement message to the application layer in response to the D2D enable request being sent by the application layer, and triggering, by the application layer, the first terminal to enable the D2D communication; or
triggering, by the RRC layer, the first terminal to enable the D2D communication.

9. A terminal, wherein the terminal is a first terminal, and the terminal comprises: a transceiver; and a processor coupled with the transceiver, wherein the processor is configured to: acquire network information, wherein the network information comprises a cell coverage result; determine, according to the network information, whether to enable device-to-device (D2D) communication for autonomously discovering a second terminal, wherein the when the cell coverage result comprises a result of discovering a cell by the first terminal, determining to enable the D2D communication in response to the result of discovering the cell by the first terminal indicating that the first terminal cannot discover the cell on all frequencies supported by the first terminal; and when the cell coverage result comprises a result of measuring a signal of a cell by the first terminal, and the measurement result comprises signal strength and/or signal quality, determining to enable the D2D communication in response to the result of measuring the signal of the cell by the first terminal indicating that a measurement result of a cell with a best measurement result is lower than a set threshold, or the result of measuring the signal of the cell indicating that measurement results of all cells are lower than a set threshold; and discover the second terminal autonomously, and control the transceiver to perform the D2D communication with the second terminal directly.

10. The terminal according to claim 9, wherein the network information further comprises a system message wirelessly sent by a network device, and the processor is configured to:
determine to forbid enabling the D2D communication in response to the system message comprising indication information of forbidding the D2D communication or none of the following items being comprised in the system message: indication information of allowing the D2D communication, warning information, and resource information of the D2D communication; or
determine to enable the D2D communication in response to the system message comprising at least one of the following items: indication information of allowing the D2D communication, resource information of the D2D communication, and warning information.

11. The terminal according to claim 10, wherein the warning information comprised in the system message comprises: earthquake and tsunami warning system (ETWS) information and/or commercial mobile alert system (CMAS) information.

12. The terminal according to claim 9, wherein the processor is further configured to detect a subscriber identity module of the first terminal and determine that the subscriber identity module can be detected.

13. The terminal according to claim 9, wherein the processor comprises:
a radio resource control (RRC) entity that acquires network information;

a non-access stratum (NAS) entity, configured to generate a D2D enable request; and an application layer entity, configured to generate a D2D enable request;

wherein the RRC entity acquires the network information after receiving the D2D enable request generated by the NAS entity; or by the application layer entity.

14. The terminal according to claim 13, wherein the RRC entity is further configured to send a D2D enable request non-acknowledgement message to the NAS entity in response to the processor determining to forbid enabling the D2D communication and in response to the D2D enable request being sent by the NAS entity; and the NAS entity is further configured to forbid enabling the D2D communication after receiving the D2D enable request non-acknowledgement message.

15. The terminal according to claim 13, wherein the RRC entity is further configured to send a D2D enable request acknowledgement message in response to the processor determining to enable the D2D communication and the D2D enable request being sent by the NAS entity.

16. The terminal according to claim 13, wherein the RRC entity is further configured to send a D2D enable request non-acknowledgement message to the application layer entity in response to the processor determining to forbid enabling the D2D communication and the D2D enable request being sent by the application layer entity; and the application layer entity is configured to forbid enabling the D2D communication after receiving the D2D enable request non-acknowledgement message.

17. The terminal according to claim 13, wherein the RRC entity is further configured to send a D2D enable request acknowledgement message in response to the processor determining to enable the D2D communication and the D2D enable request being sent by the application layer entity.

* * * * *